United States Patent
Lee et al.

(10) Patent No.: US 9,354,935 B2
(45) Date of Patent: May 31, 2016

(54) WORK PROCESSING APPARATUS FOR SCHEDULING WORK, CONTROL APPARATUS FOR SCHEDULING ACTIVATION, AND WORK SCHEDULING METHOD IN A SYMMETRIC MULTI-PROCESSING ENVIRONMENT

(75) Inventors: Sung-Hak Lee, Yongin-si (KR); Dong-Woo Im, Yongin-si (KR); Sung-Jong Seo, Hwaseong-si (KR); Hyo-Jung Song, Seoul (KR); Seung-Mo Cho, Seoul (KR)

(73) Assignee: Samsung Electronics Co., Ltd., Suwon-si (RE)

( * ) Notice: Subject to any disclaimer, the term of this patent is extended or adjusted under 35 U.S.C. 154(b) by 569 days.

(21) Appl. No.: 13/052,365

(22) Filed: Mar. 21, 2011

(65) Prior Publication Data

US 2012/0047513 A1 Feb. 23, 2012

(30) Foreign Application Priority Data

Aug. 18, 2010 (KR) .................. 10-2010-0079903

(51) Int. Cl.
*G06F 9/50* (2006.01)
*G06F 9/48* (2006.01)

(52) U.S. Cl.
CPC ............ *G06F 9/5038* (2013.01); *G06F 9/4843* (2013.01); *G06F 9/5027* (2013.01); *G06F 2209/506* (2013.01)

(58) Field of Classification Search
None
See application file for complete search history.

(56) References Cited

U.S. PATENT DOCUMENTS

| 7,810,094 B1* | 10/2010 | McClure ............... G06F 9/4881 718/100 |
| 2004/0153650 A1* | 8/2004 | Hillmer ......................... 713/176 |
| 2004/0210900 A1* | 10/2004 | Jones et al. ................... 718/100 |
| 2005/0144332 A1* | 6/2005 | Nellitheertha ........ G06F 9/4881 710/15 |
| 2007/0130567 A1 | 6/2007 | Van Der Veen |
| 2007/0174831 A1* | 7/2007 | Lee et al. ....................... 717/174 |
| 2008/0228461 A1* | 9/2008 | Calvez ............... G06F 17/5022 703/16 |
| 2008/0276242 A1* | 11/2008 | Taniguchi et al. ............ 718/103 |
| 2009/0049451 A1 | 2/2009 | Bates |
| 2009/0070772 A1* | 3/2009 | Shikano ........................ 718/106 |
| 2010/0333109 A1* | 12/2010 | Milnor .......................... 718/106 |
| 2011/0004881 A1* | 1/2011 | Terechko et al. ............. 718/102 |
| 2011/0131448 A1* | 6/2011 | Vasil ..................... G06F 9/5038 714/19 |
| 2013/0024870 A1* | 1/2013 | Yamashita ............ G06F 9/4881 718/104 |

FOREIGN PATENT DOCUMENTS

| JP | 06-161872 | 6/1994 |
| KR | 10-2000-0043730 | 7/2000 |

\* cited by examiner

*Primary Examiner* — Abdullah Al Kawsar
(74) *Attorney, Agent, or Firm* — NSIP Law

(57) ABSTRACT

A work scheduling technology in a symmetric multi-processing (SMP) environment is provided. A work scheduling function for a SMP environment is implemented in a work processing apparatus, thereby reducing the scheduling overhead, and enhancing the efficiency in use of CPU resources and improving the CPU performance.

9 Claims, 6 Drawing Sheets

WORK PROCESSING APPARATUS FOR SCHEDULING WORK, CONTROL APPARATUS FOR SCHEDULING ACTIVATION, AND WORK SCHEDULING METHOD IN A SYMMETRIC MULTI-PROCESSING ENVIRONMENT

CROSS-REFERENCE TO RELATED APPLICATION(S)

This application claims the benefit under 35 U.S.C. §119(a) of Korean Patent Application No. 10-2010-0079903, filed on Aug. 18, 2010, in the Korean Intellectual Property Office, the entire disclosure of which is incorporated by reference for all purposes.

BACKGROUND

1. Field

The following description relates to a work scheduling technique, and more particularly, to a work scheduling technique over a symmetric multi-processing environment in which multiple cores operate in a single apparatus.

2. Description of the Related Art

As multi-core devices increase, there is a need for improving the performance of the multi-core devices.

In general, in order to effectively use a multi-core computing device, a parallel programming model, such as pthread, open multi-processing (open-MP), thread building block (TBB), open computing language (open CL), and the like, may be used. These parallel programming models have their own individual schedulers to enhance the usability of the multi-core computing device.

The scheduler may vary depending on each multi-core computing device. The scheduler serves to allocate works requested by a parallel program to each device core such that the works are processed in parallel manner.

If the processing of work is requested together with a description of the dependency among the works, the scheduler detects a runnable work by analyzing the described dependency to effectively allocate the works to respective devices.

For example, in a case of a symmetric multi-processing environment in which multiple cores operate in a single device, a scheduling of works and a processing of works are performed in the same device, there is need for preventing the scheduling function from disturbing the processing of works inefficiently.

SUMMARY

In one general aspect, there is provided a work processing apparatus for work scheduling, the work processing apparatus comprising a schedule processing unit configured to resolve work dependency of works associated with another work, in response to work scheduling being activated, and configured to perform scheduling on the works of which the work dependency is resolved, and a work processing request unit configured to request at least one other work processing apparatus to process the work scheduled by the schedule processing unit.

The schedule processing unit may comprise a searching unit configured to search for a dependency work queue, a detecting unit configured to detect works of which a work dependency is resolved, from among works enqueued in a dependency work queue found by the searching unit, and a transfer unit configured to transfer the works that are detected by the detecting unit to a work runnable queue.

The schedule processing unit may further comprise a dependency resolving unit configured to resolve work dependency by dequeuing works that finish processing and enqueuing the works that finish processing in a work finish queue.

The detecting unit may detect a work that has a work dependency that is dependent on only works that are finished processing and that are enqueued in a work finish queue, as a dependency resolved work.

The work processing request unit may send another work processing apparatus a signal requesting the other work processing apparatus to process the works that are enqueued in the work runnable queue.

The work processing apparatus may further comprise a scheduling function activating unit configured to send a scheduling function activating request to a scheduling activation controlling apparatus and configured to activate the function of work scheduling based on an authorization for the scheduling function that is received from the scheduling activation controlling apparatus.

In another aspect, there is provided a scheduling activation controlling apparatus comprising an activating request reception unit configured to receive a scheduling function activating request from at least one work processing apparatus that is capable of work scheduling and that is in a waiting state for schedule processing, a selecting unit configured to select at least one work processing apparatus having sent the scheduling function activating request, and an activation authorizing unit configured to send a signal for authorizing scheduling activation to the work processing apparatus selected by the selecting unit.

The selecting unit may select a work processing apparatus having sent a scheduling function activating request which is received first by the activating request reception unit, as a work processing apparatus to perform work scheduling.

The selecting unit may select an arbitrary work processing apparatus from among work processing apparatuses having sent the scheduling function activating request to the activating request reception unit, as a work processing apparatus to perform work scheduling.

The selecting unit may select a work processing apparatus having a smallest working load from among work processing apparatuses having sent the scheduling function activating request to the activating request reception unit, as a work processing apparatus to perform work scheduling.

The scheduling activation controlling apparatus may further comprise an activation authorization cancelling unit configured to cancel the authorization for the scheduling function to the selected work processing apparatus when the selected work processing apparatus completes work scheduling.

In another aspect, there is provided a work scheduling method in a symmetric multiprocessing environment, the work scheduling method comprising performing work scheduling in which a work processing apparatus having a function of work scheduling resolves work dependency of works associated with another work, in response to the function of work scheduling being activated; and performing a scheduling on the works of which the work dependency is resolved, and requesting work processing in which a request is sent to at least one other work processing apparatus to process the works that are scheduled.

The performing of work scheduling may comprise searching for a dependency work queue, detecting works of which work dependency is resolved, from among works enqueued in a found dependency work queue, and transferring the works, which are detected in the detecting of the works, to a work runnable queue.

The performing of work scheduling may further comprise resolving work dependency by dequeuing works that finish processing and enqueuing the works in a work finish queue, before the searching for the dependency work queue.

The detecting may comprise detecting a work that is dependent on only a work that has finished processing and that is enqueued in a work finish queue, as a dependency resolved work.

The requesting may comprise sending a signal for requesting a processing of the work that is enqueued in the work runnable queue, to another work processing apparatus to process the work that is enqueued in the work runnable queue.

The work scheduling method may further comprise sending a scheduling function activating request to a scheduling activation controlling apparatus for controlling scheduling function activating, and activating the function of work scheduling based on an authorization for the scheduling function activating received from the scheduling activation controlling apparatus.

The scheduling activation controlling apparatus may select a work processing apparatus having sent a scheduling function activating request which is received first by the scheduling activation controlling apparatus as a work processing apparatus to perform work scheduling, and may send the selected work processing apparatus a signal for authorizing scheduling activation.

The scheduling activation controlling apparatus may select an arbitrary work processing apparatus from among work processing apparatuses having sent scheduling function activating requests to the scheduling activation controlling apparatus, as a work processing apparatus to perform work scheduling, and may send the selected work processing apparatus a signal for authorizing scheduling activation.

The scheduling activation controlling apparatus may select a work processing apparatus having a smallest working load from among work processing apparatuses having sent scheduling function activating requests to the scheduling activation controlling apparatus, as a work processing apparatus to perform work scheduling, and may send the selected work processing apparatus a signal for authorizing scheduling activation.

Other features and aspects will be apparent from the following detailed description, the drawings, and the claims.

Figure 1:
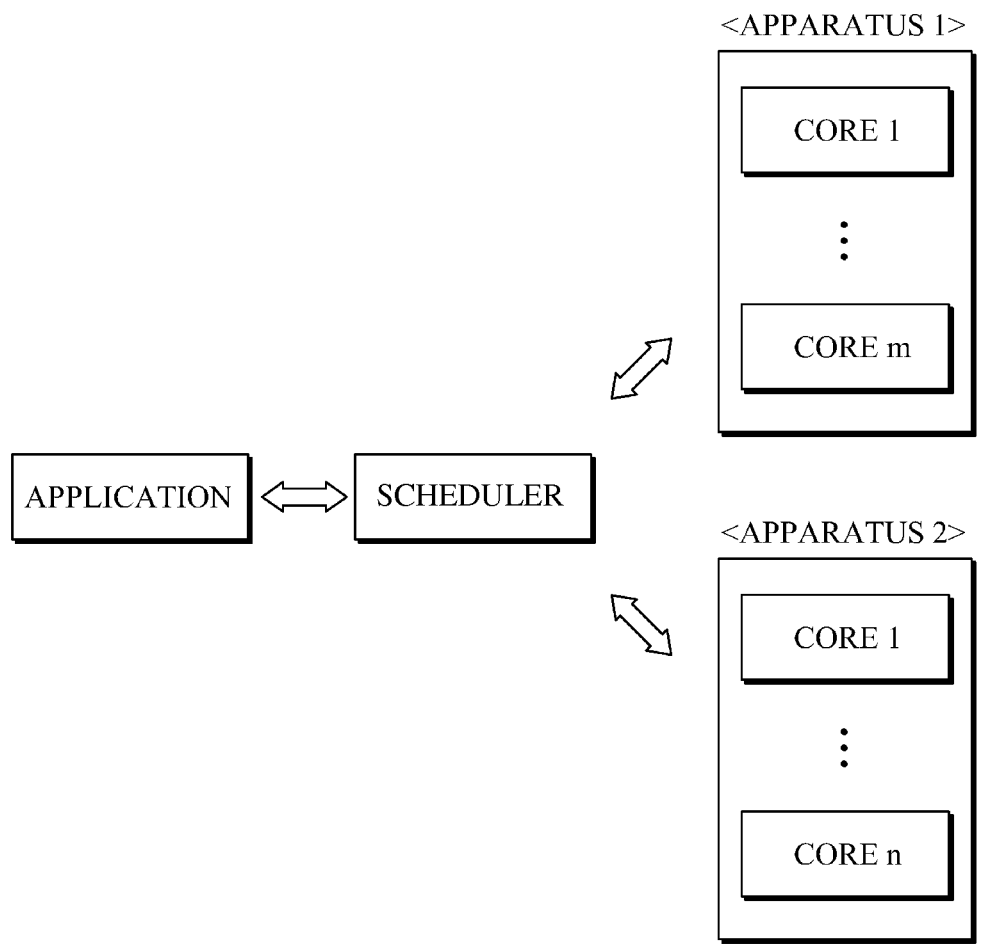
FIG. 1 is a diagram illustrating an example of work scheduling that is implemented separately from a work processing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of work scheduling that is implemented separately from a work processing apparatus.

Referring to FIG. 1, an application may request a scheduler for works that are processed in respective apparatuses.

The scheduler may allocate the works requested by the application such that the works are processed in the respective apparatuses. In response, the apparatus may process the allocated work in its core. After completing the processing of the work, the apparatus notifies the scheduler that the work processing is completed.

The scheduler may check a dependency of the works to detect a runnable work and may allocate the runnable work to each apparatus. This process may cause a difference in time between the time at which the application requests a work processing and the time at which the work is actually processed in an apparatus. This difference in time is referred to as scheduling overhead.

Figure 2:
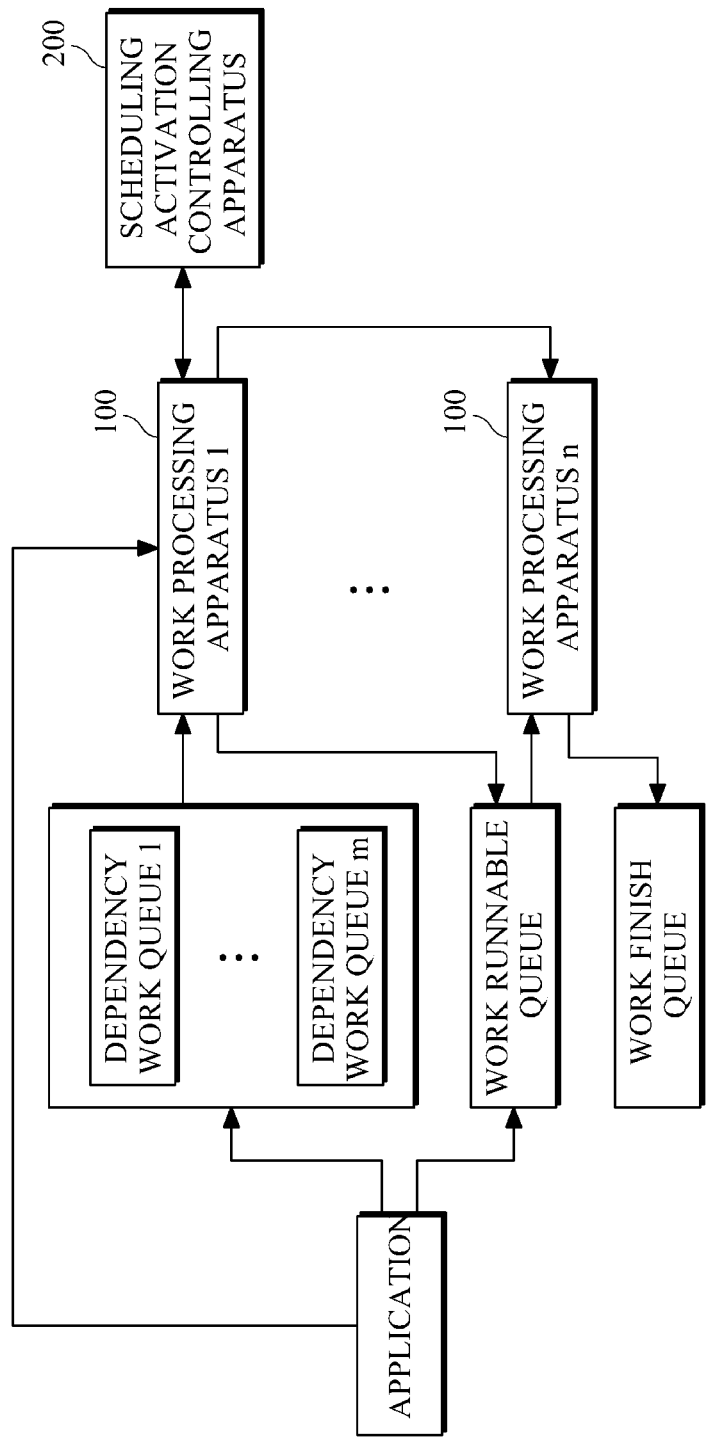
FIG. 2 is a diagram illustrating an example of work scheduling that is implemented in a work processing apparatus in a symmetric multi-processing (SMP) environment.

As described in the example of FIG. 2, scheduling overhead may be reduced and the performance of CPU resources may be improved while enhancing the efficiency in use of CPU resources in a symmetrical multi-processing environment.

FIG. 2 illustrates an example of work scheduling that is implemented in a work processing apparatus in a symmetric multi-processing (SMP) environment.

Referring to FIG. 2, the work processing apparatus enqueues a work associated with another work into a dependency queue and enqueues a work not associated with another work into a work runnable queue to make a request for work processing.

In a case in which a first work is processed, the application may send at least one work processing apparatus 100 a wake-up signal for a work scheduling request. In this example, there are a plurality of work processing apparatuses 100 (work processing apparatus 1 . . . work processing apparatus n). In response to the work scheduling request from the application, the work processing apparatus 100 may request a scheduling activation controlling apparatus 200 to activate a scheduling function.

In a case in which another work is processed after a predetermined work has been processed, the work processing apparatus 100 may enter a waiting state for work scheduling after the processing of the another work, and may request the scheduling activation controlling apparatus 200 to activate a scheduling function.

The scheduling activation controlling apparatus 200 may select at least one work processing apparatus 100 that request activation of a scheduling function as a work processing apparatus to perform work scheduling, and may grant an authorization for scheduling.

The work processing apparatus 100 that has received the authorization for a scheduling function from the scheduling activation controlling apparatus 200, may resolve dependency by dequeuing works that are finished processing and by enqueuing the finished work in a work finish queue.

In the case in which a first work is processed, the work finish queue is in an empty state, so the dependency resolving process described above may be omitted.

After the dependency is resolved by dequeuing works that are finished processing and enqueuing the finished work in the work finish queue, the work processing apparatus 100 may search for a dependency work queue, may detect a dependency resolved work among works that are enqueued in the dependency work queue, and may transfer the dependency resolved work to a work runnable queue.

The work processing apparatus 100 may send a wake up signal to request processing of the works that are enqueued in the work runnable queue, to another work processing apparatus so that scheduled works may be processed. If the work processing apparatus 100 finishes work scheduling, the scheduling activation controlling apparatus 200 may cancel the authorization for a scheduling function from the work processing apparatus 100 which has finished work scheduling.

Other work processing apparatuses that have received a wake-up signal for requesting a processing of works enqueued in the work processing queue, and are in a waiting state for work processing, may continue processing until all of the works enqueued in the work runnable queue are processed, and until the works that have finished processing are enqueued into the work finish queue.

As described above, work scheduling is implemented in a work processing apparatus, thereby reducing and/or removing the scheduling overhead that is caused when work scheduling is implemented separately from a work processing apparatus. In addition, a CPU resource is used for scheduling, and thus, the efficiency in use of the CPU resources and the performance of the CPU resources may be improved.

Figure 3:
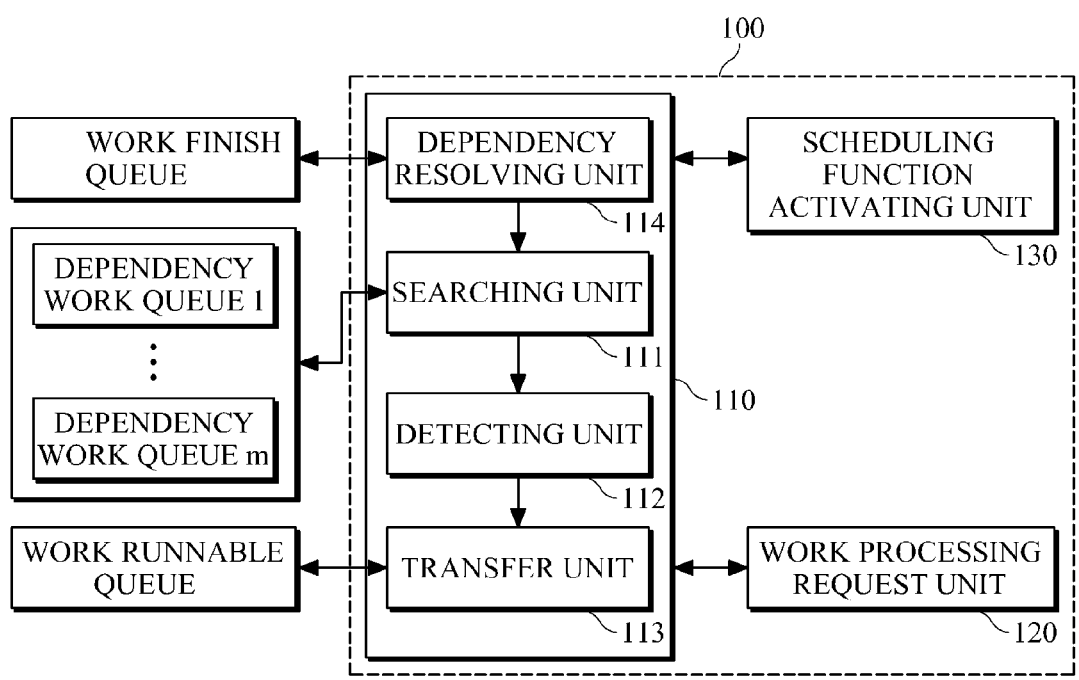
FIG. 3 is a diagram illustrating an example of a work processing apparatus for work scheduling.

FIG. 3 illustrates an example of a working processing apparatus for work scheduling.

Referring to FIG. 3, work processing apparatus 100 for work scheduling includes a schedule processing unit 110 and a work processing request unit 120.

The scheduling processing unit 110 may resolve the dependency of a work associated with another work in response to a scheduling function being activated, and may perform scheduling on the work of which the dependency is resolved. For example, the schedule processing unit 110 may include a searching unit 111, a detecting unit 112, and a transfer unit 113.

The searching unit 111 may search for a dependency work queue. A work associated with another work may be enqueued in the dependency work queue, in response to a request for work processing by an application. In order to perform work scheduling, the work processing apparatus 100 may search for the dependency work queue through the searching unit 111.

The detecting unit 112 may detect a dependency resolved work from among the works enqueued in the dependency work queue that are found by the searching unit 111. For example, the detecting unit 112 may detect a work in the dependency work queue which is dependent of only a work that has finished processing and that is enqueued in the work finish queue as the dependency resolved work.

Because the work finish queue includes only the works that are finished processing, works associated with the works present in the work finish queue among the works enqueued in the dependency work queue may represent dependency resolved works.

Accordingly, the dependency resolved work may be detected by determining the presence of a work associated with a work present in the work finish queue from among the works enqueued into the dependency work queue. For example, a work enqueued in the dependency work queue that is only dependent on works that are enqueued in the work finish queue may be referred to as works that have their dependency resolved because they are only dependent on works that have finished processing.

The transfer unit 113 may transfer the dependency resolved work detected by the detecting unit 112 to the work runnable queue. For example, the dependency resolved works may be sequentially enqueued in the work runnable queue and scheduled for processing.

The schedule processing unit 110 may further include a dependency resolving unit 114. The dependency resolving unit 114 may resolve the dependency of works by dequeuing works that are finished processing and that are enqueued in the work finish queue.

In this example, works enqueued in the dependency work queue are associated with other works, and the works enqueued in the dependency work queue are processed only after the other works are processed.

If the other works associated with the works enqueued in the dependency work queue finish processing, the other works may be enqueued in the work finish queue. The detecting unit 112 may determine whether a work associated with the work present in the work finish queue is present among works enqueued in the dependency work queue, to detect a dependency resolved work from the works enqueued in the dependency work queue.

The dependency resolved work may be transferred to the work processing queue by the transfer unit 113 and scheduled, and the dependency resolving unit 114 may dequeue the dependency resolved work enqueued in the work finish queue, thereby completing the dependency resolving operation.

In the case in which a first work is processed, the work finish queue is in an empty state, so the dependency resolving process described above may be omitted.

The work processing request unit 120 may request at least one other work processing apparatus to process the work that has been scheduled by the schedule processing unit. For example, the work processing request unit 110 may send another work processing apparatus, which is in a waiting state for work processing, a wake-up signal for requesting a processing of the work that is enqueued in the work runnable queue, such that the scheduled work may be processed.

Upon reception of the wake-up signal for requesting a processing of the work that is enqueued in the work runnable queue, the other work apparatus in a waiting state for work processing may perform work processing, for example, until all of the works enqueued in the work runnable queue are finished processing, and until all the works that have finished processing are enqueued into the work finish queue.

As described above, work scheduling may be implemented in a work processing apparatus, thereby reducing the scheduling overhead that is caused when work scheduling is implemented separately from a work processing apparatus. In addition, a CPU resource is used for scheduling, and thus, the efficiency in the use of the CPU resources and the performance of the CPU resources may be improved.

The work processing apparatus 100 for work scheduling may further include a scheduling function activating unit 130. The scheduling function activating unit 130 may send a scheduling function activation request to the scheduling activation controlling apparatus 200. In response, the scheduling activation controlling apparatus 200 may authorize the work processing apparatus 1000 to perform the scheduling function.

For example, the scheduling activation controlling apparatus 200 may activate the scheduling function of the work processing apparatus 100. An example of activating a scheduling function is described with reference to FIG. 4.

Figure 4:
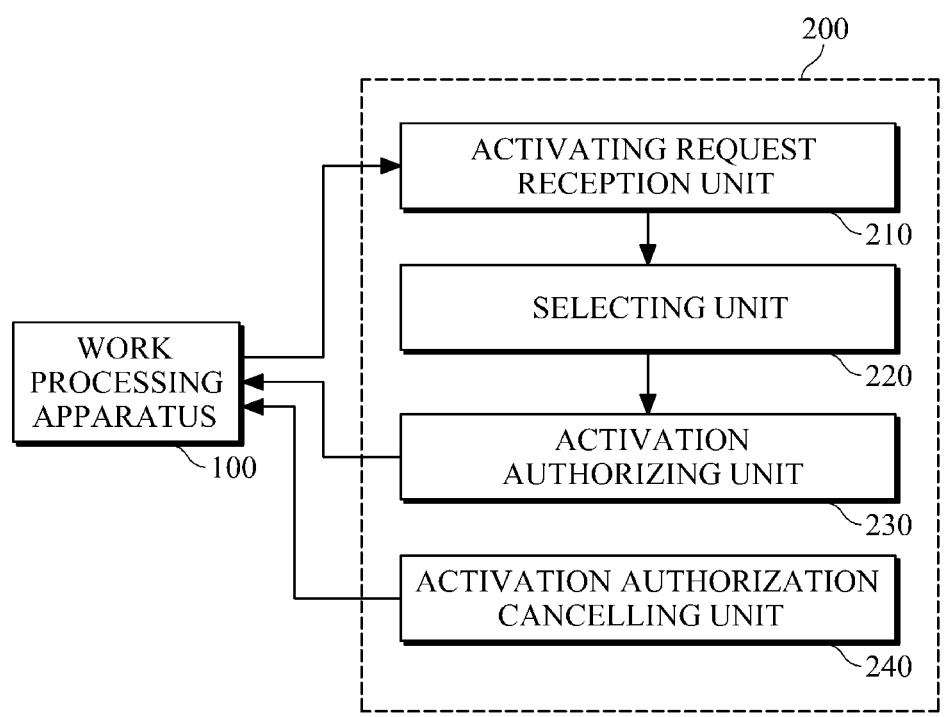
FIG. 4 is a diagram illustrating an example of a scheduling activation controlling apparatus.

FIG. 4 illustrates an example of a scheduling activation controlling apparatus.

Referring to FIG. 4, scheduling activation controlling apparatus 200 includes an activating request reception unit 210, a selecting unit 220, and an activation authorizing unit 230.

The activating request reception unit 210 may receive a scheduling function activating request from at least one work processing apparatus 100 that is in a waiting state for processing.

In the case in which a first work is processed, an application may send at least one work processing apparatus 100 a wake-up signal for a work scheduling request. In response to the work scheduling request from the application, the work processing apparatus 100 may request the scheduling activation controlling apparatus 200 to activate a scheduling function.

In the case in which another work is processed after a predetermined work has been processed, the work processing apparatus 100, which enters a waiting state for work scheduling after processing the other work, may request the scheduling activation controlling apparatus 200 to activate a scheduling function.

The scheduling activation controlling apparatus 200 may receive the request for scheduling function activation from the at least one work processing apparatus 100 through the activating request reception unit 210.

The selecting unit 220 may select at least one work processing apparatus 100 having sent the activating request reception unit 210 the scheduling function activation request, as a work processing apparatus. For example, the selecting unit 220 may select the work processing apparatus 100 to perform work scheduling by use of various types of schemes.

For example, the selecting unit 220 may select a work processing apparatus that sends the scheduling function activating request which is received first by the activating request reception unit 210, as the work processing apparatus to perform work scheduling.

For example, the scheduling activation controlling apparatus 200 may select a predetermined work processing apparatus from among work processing apparatuses 100 that sent the scheduling function activation request, as the work processing apparatus to perform work scheduling.

As another example, the selecting unit 220 may select a work processing apparatus that has a smallest working load from among work processing apparatuses that sent the scheduling function activation request to the activating request reception unit 210, as the work processing apparatus to perform work scheduling.

The activation authorizing unit 230 may send a signal for authorizing scheduling activation to the work processing apparatus selected by the selecting unit 220. The work processing apparatus 100 that receives the authorization for scheduling activation from the scheduling authorization controlling apparatus 200, may perform work scheduling as shown in FIG. 3.

The scheduling activation controlling apparatus 200 may further include an activation authorization cancelling unit 240. The activation authorization cancelling unit 240 may cancel the authorization for the scheduling function of the selected work processing apparatus 100. For example, if the selected work processing apparatus 100 completes work scheduling, the activation authorization unit 240 may cancel the authorization to perform work scheduling that was previously authorized to the work processing apparatus 100, thereby returning the corresponding work processing apparatus 100 to the waiting state for work scheduling or work processing.

Figure 5:
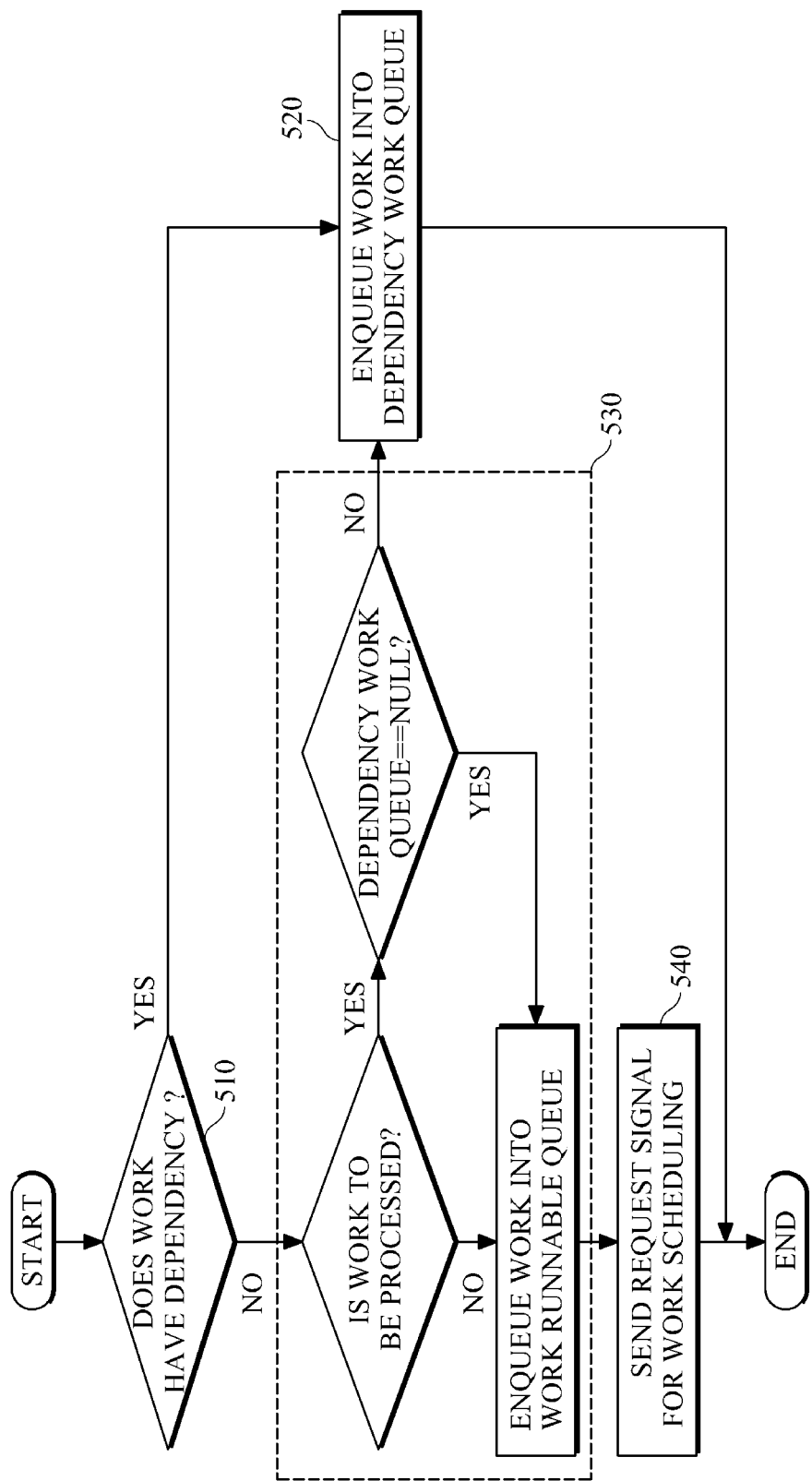
FIG. 5 is a flowchart illustrating an example of a work scheduling method.

FIG. 5 illustrates an example of a work scheduling method.

Referring to FIG. 5, it is determined whether a work which is requested to be processed by the application is a dependency work, in 510.

If the work to be processed is a dependency work, the application enqueues the corresponding work into the dependency work queue, in 520. If the work to be processed is not a dependency work, the application enqueues the corresponding work into the work runnable queue, in 530.

In 530, if a corresponding work is in a status for work processing and the dependency work queue is not empty, the application enqueues the corresponding work in the dependency work queue. If a corresponding work is not in a status for work processing or a corresponding work is in a status for work processing but the dependency work is empty, the application enqueues the corresponding work into the work runnable queue.

If works are enqueued into the dependency work queue and/or the work runnable queue, an operation of requesting scheduling function activation is performed. In the case in which the application directly enqueues a work into the work runnable queue, that is, if a first work is processed, the application may send at least one work processing apparatus a wake-up signal for requesting work scheduling and the work processing apparatus being in a waiting state for work scheduling may request the scheduling activation controlling apparatus to activate a scheduling function.

In the case in which the application enqueues a work into the dependency work queue, that is, when another work is processed after a predetermined work has been processed, the work processing apparatus, which enters a waiting state for work scheduling after processing the another work, may request the scheduling activation controlling apparatus 200 to activate a scheduling function activation.

Hereinafter, a work scheduling process of the work processing apparatus as the application enqueues a work into the dependency work queue and/or the work runnable queue as shown in FIG. 5 is described with reference to FIG. 6.

Figure 6:
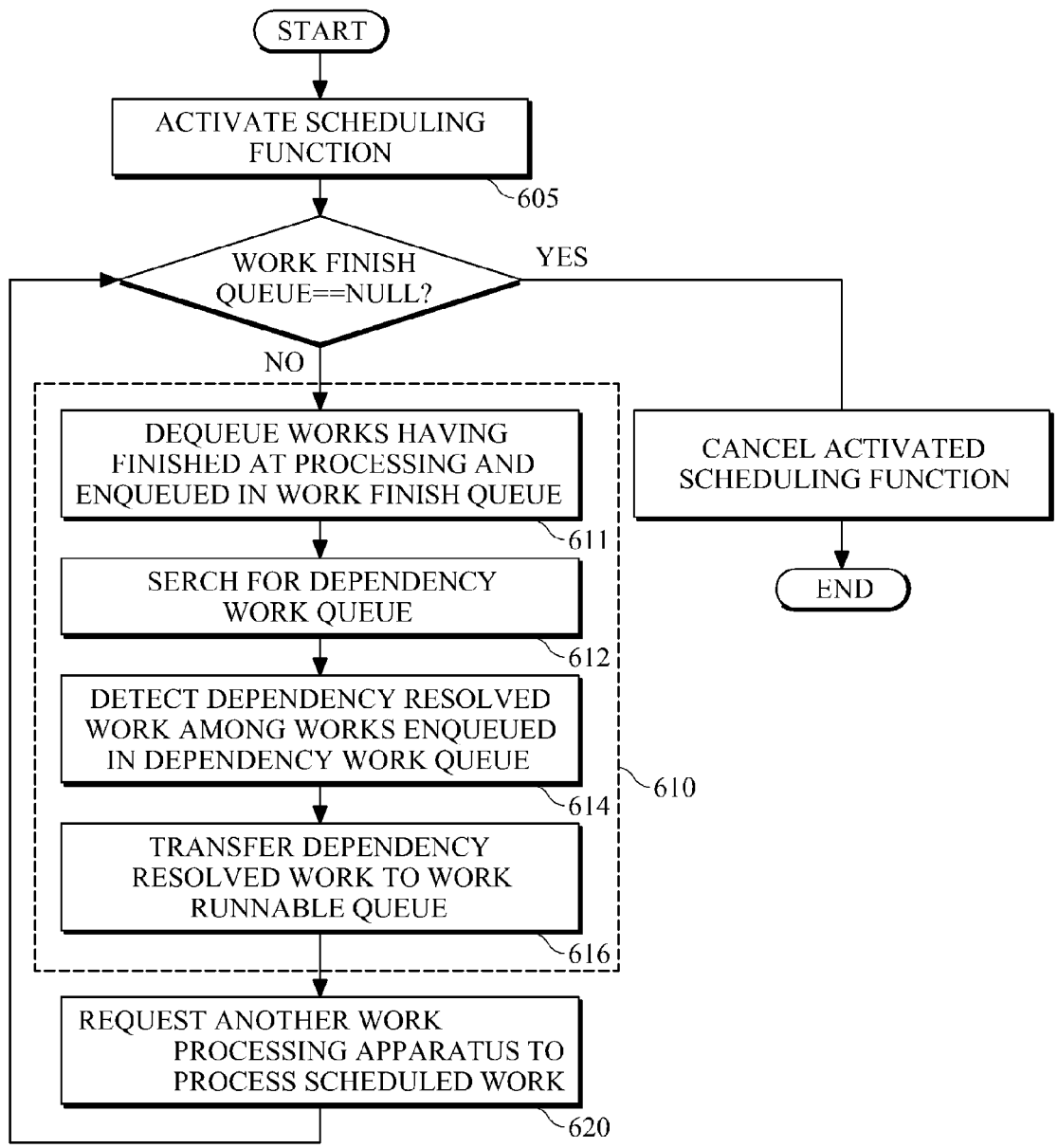
FIG. 6 is a flowchart illustrating an example of a work scheduling method in a symmetric multi-processing environment.

FIG. 6 illustrates an example of a work scheduling method in a symmetric multi-processing environment.

Referring to FIG. 6, the work processing apparatus resolves a dependency from a dependency work associated with another work when a scheduling function is activated, and performs scheduling on the dependency resolved work, in 610.

The resolving of dependency may be performed as follows. The work processing apparatus searches for a dependency work queue, in 612. In 614, a dependency resolved work is detected from works enqueued in the dependency work queue found in 612.

In the detecting of dependency resolved work, the work processing apparatus detects a work which is dependent of only work that has finished processing and that is enqueued in the work finish queue as the dependency resolved work. In 616, the work processing apparatus transfers the dependency resolved work detected in 614 to the work runnable queue.

As an example, the work scheduling method may further include resolving a dependency by dequeuing the work having finished at processing and enqueued into the work finish queue, in 611.

Because works enqueued in the dependency work queue are associated with other works, the works enqueued in the dependency work queue are processed only after the other works are processed. The dependency may be resolved by dequeuing the work that has finished processing and that is enqueued in the work finish queue.

If the work scheduling completes in 610, in 620 the work processing apparatus requests at least one other work processing apparatus to process the work that has been scheduled in 610.

For example, a work processing apparatus may send another work processing apparatus, which is in a waiting state for work processing, a wake-up signal for requesting a processing of a work that is enqueued in the work runnable queue, such that the scheduled work may be processed.

In response to receiving the request for a processing of the works enqueued in the work runnable queue, the work processing apparatus may perform work processing, for example, until all of the works enqueued in the work runnable queue are processed and until the works having finished processing are enqueued into the work finish queue.

As described above, a function of work scheduling is implemented in a work processing apparatus, thereby reducing and/or removing the scheduling overhead that is caused when a function of work scheduling is implemented separately from a work processing apparatus. In addition, a CPU resource is used for scheduling, and thus, the efficiency in use of the CPU resources and the performance of the CPU resources may be improved.

The work scheduling method may further include activating a scheduling function, in 605. In 605, the work processing apparatus being in a waiting state for work scheduling sends a scheduling function activation request to the scheduling activation controlling apparatus and activates a scheduling function based on an authorization that is received from the scheduling activation controlling apparatus.

For example, the scheduling activation controlling apparatus may select a work processing apparatus that sends a scheduling function activation request which is received first by the scheduling activation controlling apparatus, as the work processing apparatus to perform work scheduling, and may send the selected work processing apparatus an authorization signal for scheduling activation.

For example, the scheduling activation controlling apparatus may select a predetermined work processing apparatus from among work processing apparatuses that have sent the scheduling function activation request to the activating request reception unit, as the work processing apparatus to perform work scheduling, and may send the selected work processing apparatus an authorization signal for scheduling activation.

For example, the scheduling activation controlling apparatus may select a work processing apparatus that has a smallest working load from among work processing apparatuses that have sent the scheduling function activation request to the activating request reception unit, as the work processing apparatus to perform work scheduling, and may send the selected work processing apparatus an authorization signal for scheduling activation.

As described herein, in a symmetric multiprocessing environment, a function of work scheduling may be implemented in a work processing apparatus, thereby removing the scheduling overhead that is caused when a function of work scheduling is implemented separately from a work processing apparatus. In addition, a CPU resource is used for scheduling, and thus, the efficiency in use of the CPU resources and the performance of the CPU resources may be improved.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner. A number of examples are described herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A work processing apparatus for work scheduling, the work processing apparatus comprising:
    a processor;
    a scheduling function activator implemented by the processor and configured to send a scheduling function activating request to a scheduling activation controlling apparatus and configured to activate the function of work scheduling based on an authorization for the scheduling function that is received from the scheduling activation controlling apparatus;
    a scheduler implemented by the processor and configured to resolve work dependency of works associated with another work, in response to work scheduling being activated from the scheduling function activator, and configured to perform scheduling on the works of which the work dependency is resolved; and
    a work requester implemented by the processor and configured to request at least one other work processing apparatus to process the work scheduled by the scheduler after the work dependency is resolved,
    wherein the scheduler is further configured to
        search for a work associated with another work in a dependency work queue,
        detect works of which a work dependency is resolved, from among works found in a dependency work queue, wherein the works of which a work dependency is processing and that are enqueued in a work finish queue, and
        transfer the detected works to a work runnable queue.

2. The work processing apparatus of claim 1, wherein the scheduler further comprises a dependency resolver configured to resolve work dependency by dequeuing works that finish processing from a work runnable queue and enqueuing the works that finish processing in a work finish queue.

3. The work processing apparatus of claim 1, wherein the work requester sends another work processing apparatus a signal requesting the other work processing apparatus to process the works that are enqueued in the work runnable queue.

4. A work scheduling method in a symmetric multiprocessing environment, the work scheduling method comprising:
   sending, at a scheduling function activator, a scheduling function activating request to a scheduling activation controlling apparatus for controlling scheduling function activating;
   activating, at the scheduling function activator the function of work scheduling based on an authorization for the scheduling function activating received from the scheduling activation controlling apparatus;
   performing at a scheduler, work scheduling in which a work processing apparatus having a function of work scheduling resolves work dependency of works associated with another work, in response to the function of work scheduling being activated; and performing a scheduling on the works of which the work dependency is resolved; and
   requesting, at a work requester, work processing in which a request is sent to at least one other work processing apparatus to process the works that are scheduled after dependency is resolved,
   wherein the performing of work scheduling comprises
      searching for a work associated with another work in a dependency work queue,
      detecting works of which a work dependency is resolved, from among works found in a dependency work queue, wherein the works of which a work dependency is resolved, have a work dependency that is dependent on only works that are finished processing and that are enqueued in a work finish queue, and transferring the detected works to a work runnable queue.

5. The work scheduling method of claim 4, wherein the performing of work scheduling further comprises resolving work dependency by dequeuing works that finish processing from a work runnable queue and enqueuing the works in a work finish queue, before the searching for the dependency work queue.

6. The work scheduling method of claim 4, wherein the requesting comprises sending a signal for requesting a processing of the work that is enqueued in the work runnable queue, to another work processing apparatus to process the work that is enqueued in the work runnable queue.

7. The work scheduling method of claim 4, wherein the scheduling activation controlling apparatus selects a work processing apparatus having sent a scheduling function activating request which is received first by the scheduling activation controlling apparatus as a work processing apparatus to perform work scheduling, and sends the selected work processing apparatus a signal for authorizing scheduling activation.

8. The work scheduling method of claim 4, wherein the scheduling activation controlling apparatus selects an arbitrary work processing apparatus from among work processing apparatuses having sent scheduling function activating requests to the scheduling activation controlling apparatus, as a work processing apparatus to perform work scheduling, and sends the selected work processing apparatus a signal for authorizing scheduling activation.

9. The work scheduling method of claim 4, wherein the scheduling activation controlling apparatus selects a work processing apparatus having a smallest working load from among work processing apparatuses having sent scheduling function activating requests to the scheduling activation controlling apparatus, as a work processing apparatus to perform work scheduling, and sends the selected work processing apparatus a signal for authorizing scheduling activation.

* * * * *